(12) United States Patent
Tredan

(10) Patent No.: US 9,126,295 B2
(45) Date of Patent: Sep. 8, 2015

(54) DEVICE FOR THE POSITION-ADJUSTMENT AND ATTACHMENT OF A LOCKING MEMBER ON A SUPPORT WITH COMPENSATION FOR PLAY

(75) Inventor: Eric Tredan, Sceaux (FR)

(73) Assignee: RENAULT S.A.S., Boulogne-Billancourt (FR)

(*) Notice: Subject to any disclaimer, the term of this patent is extended or adjusted under 35 U.S.C. 154(b) by 255 days.

(21) Appl. No.: 13/697,304

(22) PCT Filed: May 6, 2011

(86) PCT No.: PCT/FR2011/051029
§ 371 (c)(1),
(2), (4) Date: Dec. 12, 2012

(87) PCT Pub. No.: WO2011/141667
PCT Pub. Date: Nov. 17, 2011

(65) Prior Publication Data
US 2013/0074325 A1    Mar. 28, 2013

(30) Foreign Application Priority Data

May 10, 2010  (FR) ...................................... 10 53617

(51) Int. Cl.
*B23P 25/00* (2006.01)
*B60K 1/04* (2006.01)

(52) U.S. Cl.
CPC . *B23P 25/00* (2013.01); *B60K 1/04* (2013.01); *B60K 2001/0455* (2013.01); *B60K 2001/0472* (2013.01); *Y10T 29/53022* (2015.01)

(58) Field of Classification Search
CPC ...... B25B 11/02; B25B 23/1427; B23P 19/00
USPC .................. 29/281.1; 269/37, 55, 289 R, 291
See application file for complete search history.

(56) References Cited

U.S. PATENT DOCUMENTS

| 4,186,916 A | * | 2/1980 | Varga | 269/303 |
| 5,060,920 A | * | 10/1991 | Engibarov | 269/282 |
| 5,064,321 A | * | 11/1991 | Barnes | 409/219 |

(Continued)

FOREIGN PATENT DOCUMENTS

| FR | 2 885 871 | 11/2006 |
| FR | 2 934 927 | 2/2010 |
| FR | 2 936 760 | 4/2010 |

OTHER PUBLICATIONS

International Search Report Issued Aug. 22, 2011 in PCT/FR11/51029 Filed May 6, 2011.

*Primary Examiner* — Lee D Wilson
(74) *Attorney, Agent, or Firm* — Oblon, McClelland, Maier & Neustadt, L.L.P.

(57) ABSTRACT

A device for fixing to a support a first part of a locking member including a base, an internal face of which can be kept clamped flat against the support by a screw-nut assembly and a body connected to the base configured to collaborate with a second part of a locking member secured to a component that is to be assembled into the support. The device includes a mechanism positioning the first part of the locking member in a reference plane formed by three other corresponding first parts of the locking member which are positioned on the support, and the screw-nut assembly includes a mechanism automatically taking up any play, configured to take up the play between the internal face of the base and the support as the screw-nut assembly is tightened.

16 Claims, 2 Drawing Sheets

(56) References Cited

U.S. PATENT DOCUMENTS

| | | | |
|---|---|---|---|
| 5,305,992 A * | 4/1994 | Kish | 269/51 |
| 6,578,246 B2 * | 6/2003 | Chen | 29/239 |
| 6,702,269 B1 * | 3/2004 | Tadich | 269/37 |
| 2008/0203643 A1 * | 8/2008 | Boersma | 269/289 R |
| 2008/0265620 A1 | 10/2008 | Aleman | |
| 2011/0139527 A1 | 6/2011 | Bannier et al. | |
| 2013/0074325 A1 * | 3/2013 | Tredan | 29/705 |
| 2013/0239401 A1 * | 9/2013 | Masakawa | 29/559 |

* cited by examiner

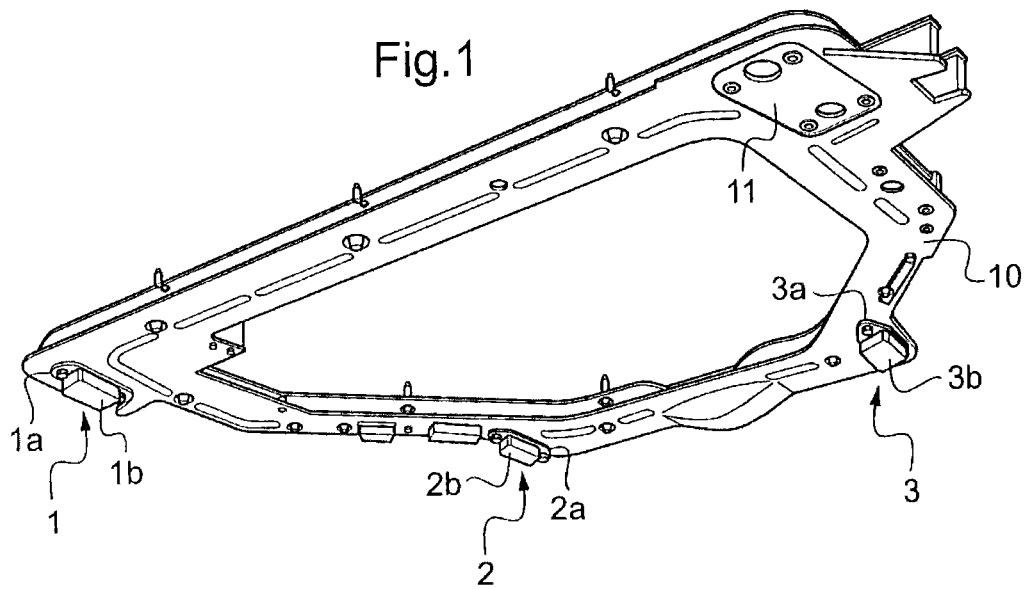
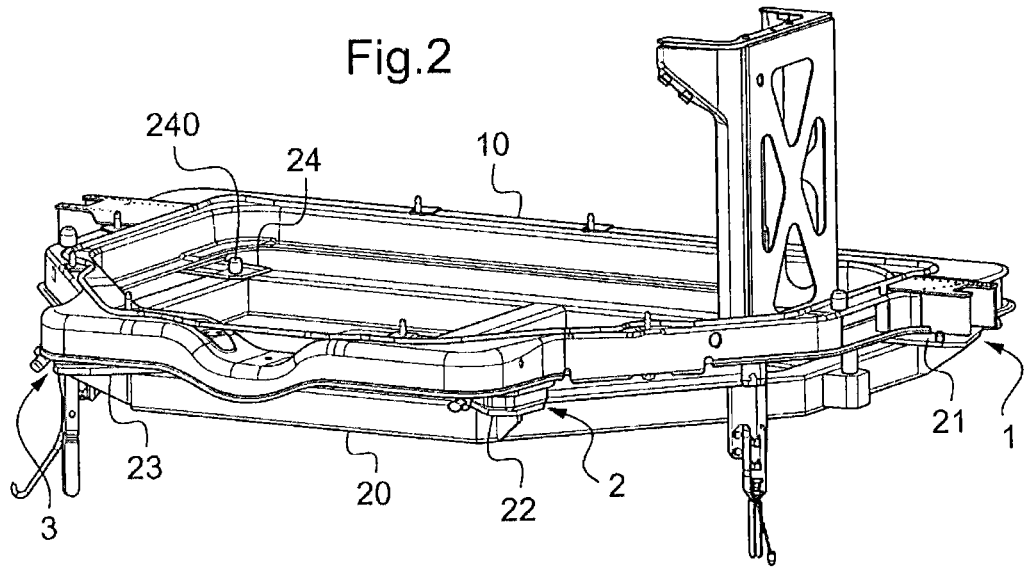

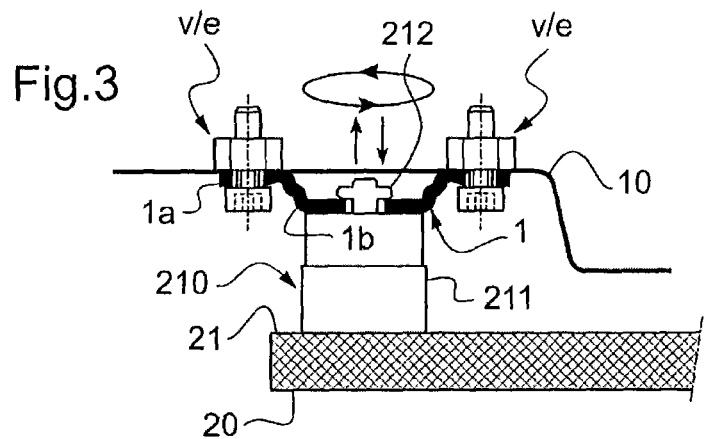
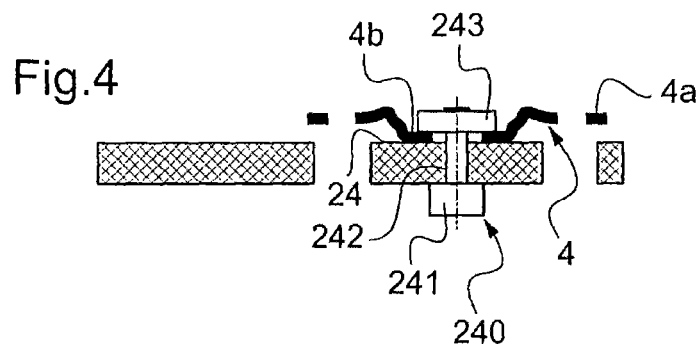
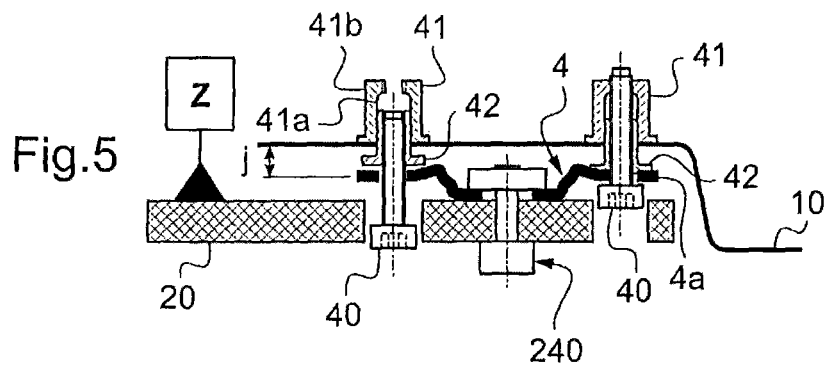
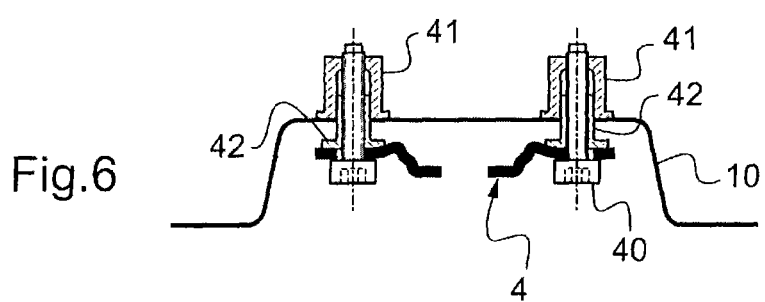

DEVICE FOR THE POSITION-ADJUSTMENT AND ATTACHMENT OF A LOCKING MEMBER ON A SUPPORT WITH COMPENSATION FOR PLAY

BACKGROUND

The invention concerns a device for the position-adjustment and attachment of at least one locking member first part on a support, said locking member first part being of the type including a base the internal face of which is adapted to be held clamped in plane bearing engagement against said support by means of at least one nut-and-bolt assembly and a body connected to said base designed to cooperate with a locking member second part rigidly fastened to a part to be assembled to said support, to effect the assembly of said part to said support.

The invention applies more particularly, but not exclusively, to the attachment of motor vehicle traction battery locks to a motor vehicle body or to a battery frame attached to the body with a view to assembling the traction battery to the motor vehicle body or to the frame attached to the body.

Numerous examples of arrangements for mounting a traction battery in a motor vehicle are known. In most of these arrangements, the battery is attached rigidly, by means of attachment locks, either to a frame that carries it, intended to be attached to the body of the vehicle, or directly to the body of the vehicle. Each attachment lock is in fact constituted of a male member rigidly fastened to a first element selected from the battery and the body (or frame), typically the battery, and a female member attached to the second element selected from the battery and the body (or frame), typically the body (or frame), and adapted to receive the male locking member in mutual interengagement thereby to assure the attachment of the battery to the body (or frame).

A conventional battery forms a compact assembly of high mass, possibly weighing more than 200 kg, and must therefore be attached by a large number of these attachment locks to the vehicle body or to the frame attached to the body. The number of attachment locks is typically greater than three and most often at least equal to four.

A major disadvantage of attachment systems of this type is that they work correctly only on condition that the relative positioning of the male and female members during mounting of the battery are perfectly controlled and reproducible from one vehicle to another. In particular, it is important for the four retaining points to be perfectly aligned in a plane Z, i.e. in the direction of mutual interengagement of the locking members.

Indeed, if the four retaining points are not coplanar, there is a risk of a certain number of problems arising. In particular, the battery may be damaged because it cannot be deformed beyond a certain critical threshold liable to compromise its physical integrity. Moreover, the locking force being a function of the distance between the corresponding male and female locking members, variations in Z between the four members positioned on the support can lead to problems with the reliability of the attachment lock having the greatest distance between its male and female members during mounting of the battery on the support.

In the case of the vehicle body, there exist large dimensional variations liable to affect the positioning of the four female locking members in the same plane. In the case of mounting the battery on a frame, when attaching the latter to the vehicle body, the frame and/or the body are deformed, likewise affecting the coplanar relationship of the four female locking members.

Given these dimensional variation constraints, the alignment in Z of the (at least) four locking members on the body (or frame) is rendered problematic in that it is difficult to position them in the same plane.

BRIEF SUMMARY

In this context, the object of the invention is to remedy this drawback, and to propose a device of the aforementioned type that enables compensation of said variations and simple and easy positioning of the at least four locking members on the support in the same plane.

To this end, the device of the invention, in other respects conforming to the generic definition thereof given hereinabove in the preamble, is essentially characterized in that it includes positioning means adapted to position and to retain said locking member first part in a reference plane formed by three other corresponding locking member first parts positioned on said support, and in that said nut-and-bolt assembly includes automatic play compensating means adapted to compensate the play between said internal face of said base and said support when tightening said nut-and-bolt assembly.

Said automatic play compensating means preferably include a mobile play compensation nut with oppositely handed interior and exterior threads screwed into a first part of the nut-and-bolt assembly including a fixed clamping nut rigidly fastened to said support at the level of a first part of said fixed nut matching the exterior thread of said mobile nut, the interior thread of said mobile nut matching the thread of an attachment bolt forming a second part of the nut-and-bolt assembly so that said mobile nut is adapted to move axially in said fixed nut rigidly fastened to said support when screwing said attachment bolt to abut at one of its free ends against said base through which said attachment bolt passes.

Said fixed nut rigidly fastened to said support advantageously includes a second part matching the external thread of said attachment bolt so that said attachment bolt is adapted to interengage with said second part of said fixed nut when the free end of said mobile nut abuts on said base.

Said second part of said fixed nut rigidly fastened to said support and said attachment bolt are preferably adapted to define a clamping torque of at least 21 Newton-meters.

In one embodiment, said positioning means include a rigid template adapted to be placed facing the support and including respective coplanar bearing areas adapted to come to bear on said corresponding three other locking member first parts positioned on said support and at least one retaining area situated in the same plane as said bearing areas and intended to position and to retain said locking member first part to be attached to said support in said reference plane.

Said bearing areas advantageously include removable attachment means adapted to cooperate with said other three locking member first parts so as to attach said template removably to said other three locking member first parts at the level of said respective bearing areas.

Said retaining area advantageously includes removable attachment means adapted to cooperate with said locking member first part to attach said locking member first part removably to said template over said retaining area.

Said locking member second part preferably includes a male member rigidly fastened to a traction battery of a motor vehicle and said locking member first part preferably includes a female member designed to receive said male member in mutual interengagement to assemble said traction battery to said support.

Said support can include a motor vehicle body or a battery frame attached to a motor vehicle body.

The invention further concerns a method for the position-adjustment and attachment of at least one locking member first part to a support, said locking member first part being designed to cooperate with a locking member second part rigidly fastened to a part to be assembled to said support, to effect the assembly of said part to said support, said method being characterized in that it includes a preliminary step consisting in attaching three other corresponding locking member first parts to said support, and in that it includes the following steps consisting in retaining said locking member first part in position in a reference plane formed by said other three corresponding locking member first parts previously positioned on said support and attaching to said support said locking member first part retained in this way in said reference plane with automatic compensation of the play between said support and said locking member first part so that said locking member first part is positioned on said support in said reference plane of the other three locking member first parts previously positioned on said support.

BRIEF DESCRIPTION OF THE DRAWINGS

Other particular features and advantages of the invention will emerge on reading the description of one particular non-limiting and illustrative embodiment of the invention given hereinafter with reference to the appended drawings, in which:

FIG. 1 is a view of a part of the battery frame to which are attached three locking member first parts constituting the reference plane for mounting the traction battery;

FIG. 2 is a view of the battery frame from FIG. 1 with which is associated the template for positioning at least one additional locking member first part relative to the reference plane constituted of the three other locking member first parts previously attached to the frame;

FIG. 3 is a detail view showing the principle of attaching the template to the other three locking member first parts previously attached to the frame;

FIG. 4 is a detail view showing the retention of the template of the additional locking member first part intended to be attached to the frame relative to the reference plane constituted of the three locking member first parts already attached to the frame;

FIG. 5 is a detail view showing the principle of attaching to the frame with compensation of play of this additional locking member first part positioned and retained in the reference plane with the aid of the template;

FIG. 6 is a detail view showing the final position of this additional locking member first part once attached to the frame.

DETAILED DESCRIPTION

The invention will therefore be described with reference to the preferred application, which concerns the attachment of locking member first parts of a traction battery, here the female members, to a support such as the body of a motor vehicle or a frame attached to the body. Once attached to the support, these female members are then intended to cooperate with complementary locking member second parts attached to the battery, here the male members, to mount the battery on the support.

FIG. 1 relates more particularly to an embodiment in which the support is constituted by a battery frame 10 intended to be attached to a motor vehicle body. However, the principle of the invention does not necessarily imply the presence of a battery frame, in which case the locking member first parts that will be referred to hereinafter could be attached directly to the motor vehicle body.

The invention starts from the principle that it is relatively easy to position three distinct points in the same plane. Also, as claimed in the invention, three first female members 1, 2 and 3 are first positioned and attached at respective locations provided for this purpose on the frame 10, so as to constitute the reference plane for mounting the traction battery. The frame 10 also includes a location area 11 intended to accept a fourth female member necessary for mounting the traction battery on the frame.

For example, each female member 1, 2 and 3 is constituted of a respective base 1a, 2a and 3a and a respective body 1b, 2b and 3b the upper face of which, opposite the base, is provided with an opening intended to cooperate with the corresponding male member of the battery lock. The internal face of each female member base is designed to be held clamped in plane bearing engagement against the frame, for example by means of two nut-and-bolt assemblies v/e (see FIG. 3) each constituted of an attachment bolt passing through the base and the frame and a nut that comes to bear against the opposite face of the frame, enabling the transmission of a clamping force sufficient for the requirements of the application, for example 21 Newton-meters.

The battery frame 10 is then itself attached to the body. The battery frame and/or the body are liable to be deformed during this operation, so that a new reference plane passing through the three female members 1, 2 and 3 is obtained, relative to which the fourth female member that has to be attached to the frame 10 will be able to be positioned precisely to attach this fourth member to the frame in the reference plane of the other three members already attached.

To this end, referring to FIG. 2, positioning means 20 adapted to position and retain this fourth female member in the reference plane are used. These means 20 for positioning the fourth female member (not shown in FIG. 2) relative to the reference plane constituted by the other three female members 1, 2 and 3 takes the form of a template of rigid structure, adapted to be placed facing the frame 10 and including three coplanar bearing areas 21, 22 and 23, respectively, designed to come to bear on the three female members 1, 2 and 3, respectively, that have previously been positioned on the frame 10 and, to be more precise, against the upper faces of the bodies of these female members, so that the template 20 is therefore positioned precisely in the reference plane constituted of the three female members 1, 2 and 3 previously attached to the frame.

The template 20 must be firmly retained in the reference plane. To this end, each bearing area 21, 22 and 23 is provided with removable means for attaching it to the corresponding female member 1, 2 and 3, respectively, on which it comes to bear, enabling the template 20 to be removably attached to these female members at the level of its respective bearing areas.

These attachment means are shown in detail in FIG. 3, showing the removable attachment of the template 20 at the level of its bearing area 21 to the female member 1 previously attached to the frame 10. In this embodiment, the removable attachment means 210 rigidly attached to the bearing area 21 include a quarter-turn member having maneuvering means 211 that terminates in a locking shape 212, such as a finger having any shape appropriate for cooperating with the opening provided in the upper face of the body 1b of the female member 1 and thus to lock the attachment means 210 of the bearing area 21 removably to the female member 1.

The template 20 also includes a retaining area 24 situated in the same plane as the three bearing areas 21, 22 and 23 and thus enabling, when the template is positioned so as to bear against the three female members 1, 2 and 3 previously attached to the frame 10, the fourth female member that has to be attached to the frame 10 to be retained in position in the reference plane constituted of these three female members 1, 2 and 3. This fourth female member must also be firmly retained on the template.

To this end, the retaining area 24 includes removable attachment means 240 adapted to cooperate with the fourth female member positioned on the retaining area to attach this fourth female member removably to the template at the level of the retaining area in order to attach it to the frame 10.

FIG. 4 shows the details of these attachment means, thus showing the removable attachment of the fourth female member 4 to the retaining area 24 of the template 20. Like the other female members previously attached to the frame, the fourth female member 4 that has to be attached includes a base 4a the internal face of which is adapted to be held clamped in plane bearing engagement against the frame and a body 4b the upper face of which, opposite the base, is provided with an opening intended to cooperate with the corresponding male member of the battery lock. The upper face of the body 4b is positioned on the retaining area 24. In this embodiment, the removable attachment means 240 include a quarter-turn member including maneuvering means 241 and situated on the opposite face of the template to that receiving the retaining area on which the upper face of the female member is positioned and a rod 242 passing through the template, which ends in a locking shape 243, such as a finger having any appropriate shape to cooperate with the opening provided on the upper face of the body 4b of the female member 4, and thus to lock the fourth female member 4 removably to the template at the level of the retaining area.

As shown in FIG. 5, once the fourth female member 4 has been positioned on and retained to the template 20, the latter is positioned on the three female members 1, 2 and 3 already attached to the battery frame forming the reference plane Z. The template 20 then makes it possible to retain the fourth female member 4 in position in the reference plane formed of the other female members already positioned on the frame 10.

It should be noted that the play j between the fourth female member 4 positioned in this way and the frame 10 is different for each vehicle. The means for attaching the fourth female member 4 to the frame 10 advantageously include play compensating means enabling the fourth female member to be attached at the required position defined by the template with automatic compensation of the play in question at the same time as being able to transmit the necessary tension in the assembly.

To this end, in the FIG. 5 example, the fourth female member is attached to the frame by means of two nut-and-bolt assemblies each constituted of an attachment bolt 40 passing through the base 4a of the female member 4 and a fixed nut 41 rigidly fastened to the frame 10. This nut is for example welded, crimped or clipped to the frame, on the opposite side of the frame to that on which the internal face of the base 4a is intended to be held clamped in plane bearing engagement.

Each nut-and-bolt assembly for attaching the fourth female member to the frame is thus provided with means for automatically compensating the play j between the frame and the internal face of the base of the fourth female member positioned by the template, adapted to compensate the play j during tightening of the attachment bolt 40 of each nut-and-bolt assembly.

To be more precise, the means for automatically compensating play include a mobile play compensation nut 42 with oppositely handed interior and exterior threads. The mobile nut 42 with two threads is screwed into the fixed clamping nut 41 rigidly fastened to the frame at the level of a part 41a of that fixed nut matching the exterior thread of the mobile nut. In the initial position (not represented in FIG. 5), the mobile nut is screwed into the fixed nut so as to come into contact with the frame. In this initial position, no torque must be applied between this mobile nut 42 and the body.

The fourth female member 4 being positioned by the template, the attachment bolts 40 of the fourth female member 4 are then screwed in. The inside diameter of the mobile nut 42 matches the diameter of the attachment bolt 40 so that, when the attachment bolt 40 comes into contact with the mobile nut 42, the latter is moved axially by friction in the fixed nut 41 and descends until it abuts against the base 4a of the female member 4.

At this stage the base 4a of the female member 4 retained in position by the template 20 immobilizes the mobile nut 42 and the tension necessary for the bolted assembly is applied. To this end, the fixed nut 41 rigidly fastened to the frame 10 has a second part 41b matching the thread of the attachment bolt 40. Accordingly, the mobile nut being immobilized, the attachment bolt then begins to ascend and, when it is interengaged with the second part 41b of the fixed nut and the nominal tension, for example at least 21 Newton-meters, is reached, the bolted assembly remains under tension.

The template 20 must have a sufficiently rigid structure to prevent any deformation during tightening of the attachment bolts of the fourth female member and thus to guarantee the position of the fourth female member in the reference plane.

FIG. 6 shows the fourth female member 4 when attached to the frame 10 in accordance with the principles explained above, in a position geometrically coplanar with the other three female members 1, 2 and 3 forming the reference plane. Furthermore, the means for attaching the fourth female member with automatic compensation of play advantageously enable sufficient tension to be transmitted in the assembly to withstand the forces retaining the traction battery to be mounted on the frame.

Thanks to this particular arrangement for the position-adjustment and attachment of the fourth female member to the frame relative to the reference plane formed by the other three female members previously attached to the frame, the locking of the four attachment locks of the traction battery is therefore rendered possible without deformation of the frame when mounting the battery thereon.

The arrangement that has just been described may moreover be used for elements other than the attachment of female members of battery locks to a motor vehicle body or to a frame attached to the body.

The invention claimed is:

1. A device for position-adjustment and attachment of at least one locking member first part on a support, the locking member first part including a base having an internal face configured to be held clamped in plane bearing engagement against the support by at least one nut-and-bolt assembly and a body connected to the base configured to cooperate with a locking member second part rigidly fastened to a part to be assembled to the support, to effect assembly of the part to the support, the device comprising:

a positioning template configured to position and to retain the locking member first part on a first face of the positioning template in a reference plane formed by three other corresponding locking member first parts positioned on the support, wherein the positioning template includes three coplanar bearing areas on the first face of the positioning template to bear against the three other corresponding locking member first parts, the positioning template includes a removable attachment device that removably retains the locking member first part against a retaining area on the first face of the positioning template in the reference plane, the removable attachment device including a locking end in contact with the internal face of the base of the locking member first part, a maneuvering end positioned on a second face of the positioning template, the second face being opposite to the first face, and a rod extending through the retaining area to connect the locking end to the maneuvering end, the removable attachment device being spaced apart from the nut-and-bolt assembly on the locking member first part, and the nut-and-bolt assembly includes automatic play compensating means configured to compensate play between the internal face of the base and the support when tightening the nut-and-bolt assembly.

2. A device for position-adjustment and attachment of at least one locking member first part on a support, the locking member first part including a base having an internal face configured to be held clamped in plane bearing engagement against the support by at least one nut-and-bolt assembly and a body connected to the base configured to cooperate with a locking member second part rigidly fastened to a part to be assembled to the support, to effect assembly of the part to the support, the device comprising:

a positioning template configured to position and to retain the locking member first part in a reference plane formed by three other corresponding locking member first parts positioned on the support, wherein the nut-and-bolt assembly includes automatic play compensating means configured to compensate play between the internal face of the base and the support when tightening the nut-and-bolt assembly, the automatic play compensating means includes a mobile play compensation nut with oppositely handed interior and exterior threads screwed into a first part of the nut-and-bolt assembly including a fixed clamping nut rigidly fastened to the support at a level of a first part of the fixed nut matching the exterior thread of the mobile nut, and the interior thread of the mobile nut matching the thread of an attachment bolt forming a second part of the nut-and-bolt assembly so that the mobile nut is configured to move axially in the fixed nut rigidly fastened to the support when screwing the attachment bolt to abut at one of its free ends against the base through which the attachment bolt passes.

3. The device as claimed in claim 2, wherein the fixed nut rigidly fastened to the support includes a second part matching the external thread of the attachment bolt so that the attachment bolt is configured to interengage with the second part of the fixed nut rigidly fastened to the support when the free end of the mobile nut abuts on the base.

4. The device as claimed in claim 3, wherein the second part of the fixed nut rigidly fastened to the support and the attachment bolt are configured to define a clamping torque of at least 21 Newton-meters.

5. The device as claimed in claim 1, wherein the bearing areas include removable attachment means configured to cooperate with the other three locking member first parts so as to attach the positioning template removably to the other three locking member first parts at a level of the respective bearing areas.

6. A device for position-adjustment and attachment of at least one locking member first part on a support, the locking member first part including a base having an internal face configured to be held clamped in plane bearing engagement against the support by at least one nut-and-bolt assembly and a body connected to the base configured to cooperate with a locking member second part rigidly fastened to a part to be assembled to the support, to effect assembly of the part to the support, the device comprising:

a positioning template configured to position and to retain the locking member first part in a reference plane formed by three other corresponding locking member first parts positioned on the support, wherein the nut-and-bolt assembly includes automatic play compensating means configured to compensate play between the internal face of the base and the support when tightening the nut-and-bolt assembly, and the locking member second part includes a male member rigidly fastened to a traction battery of a motor vehicle and the locking member first part includes a female member configured to receive the male member in mutual interengagement to assemble the traction battery to the support.

7. The device as claimed in claim 1, wherein the support includes a motor vehicle body or a battery frame attached to a motor vehicle body.

8. The device as claimed in claim 1, wherein the automatic play compensating means includes a mobile play compensation nut with oppositely handed interior and exterior threads screwed into a first part of the nut-and-bolt assembly including a fixed clamping nut rigidly fastened to the support at a level of a first part of the fixed nut matching the exterior thread of the mobile nut, and the interior thread of the mobile nut matching the thread of an attachment bolt forming a second part of the nut-and-bolt assembly so that the mobile nut is configured to move axially in the fixed nut rigidly fastened to the support when screwing the attachment bolt to abut at one of its free ends against the base through which the attachment bolt passes.

9. The device as claimed in claim 8, wherein the fixed nut rigidly fastened to the support includes a second part matching the external thread of the attachment bolt so that the attachment bolt is configured to interengage with the second part of the fixed nut rigidly fastened to the support when the free end of the mobile nut abuts on the base.

10. The device as claimed in claim 9, wherein the second part of the fixed nut rigidly fastened to the support and the attachment bolt are configured to define a clamping torque of at least 21 Newton-meters.

11. The device as claimed in claim 1, wherein the locking member second part includes a male member rigidly fastened to a traction battery of a motor vehicle and the locking member first part includes a female member configured to receive the male member in mutual interengagement to assemble the traction battery to the support.

12. The device as claimed in claim 2, wherein the locking member second part includes a male member rigidly fastened to a traction battery of a motor vehicle and the locking member first part includes a female member configured to receive the male member in mutual interengagement to assemble the traction battery to the support.

13. The device as claimed in claim 2, wherein the support includes a motor vehicle body or a battery frame attached to a motor vehicle body.

14. The device as claimed in claim 6, wherein
the automatic play compensating means includes a mobile play compensation nut with oppositely handed interior and exterior threads screwed into a first part of the nut-and-bolt assembly including a fixed clamping nut rigidly fastened to the support at a level of a first part of the fixed nut matching the exterior thread of the mobile nut, and
the interior thread of the mobile nut matching the thread of an attachment bolt forms a second part of the nut-and-bolt assembly so that the mobile nut is configured to move axially in the fixed nut rigidly fastened to the support when screwing the attachment bolt to abut at one of its free ends against the base through which the attachment bolt passes.

15. The device as claimed in claim 14, wherein the fixed nut rigidly fastened to the support includes a second part matching the external thread of the attachment bolt so that the attachment bolt is configured to interengage with the second part of the fixed nut rigidly fastened to the support when the free end of the mobile nut abuts on the base.

16. The device as claimed in claim 15, wherein the second part of the fixed nut rigidly fastened to the support and the attachment bolt are configured to define a clamping torque of at least 21 Newton-meters.

\* \* \* \* \*